(12) United States Patent
Valladares Meza et al.

(10) Patent No.: US 10,576,894 B2
(45) Date of Patent: Mar. 3, 2020

(54) SYSTEMS AND METHODS FOR CONTROLLING VEHICLE SIDE MIRRORS AND FOR DISPLAYING SIMULATED DRIVER FIELD OF VIEW

(71) Applicants: Roberto R Valladares Meza, Auburn Hills, MI (US); Cesar D Hernandez Urbina, Birmingham, MI (US)

(72) Inventors: Roberto R Valladares Meza, Auburn Hills, MI (US); Cesar D Hernandez Urbina, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 43 days.

(21) Appl. No.: 15/996,912

(22) Filed: Jun. 4, 2018

(65) Prior Publication Data

US 2019/0366930 A1    Dec. 5, 2019

(51) Int. Cl.
| | |
|---|---|
| *B60R 1/02* | (2006.01) |
| *G06F 3/00* | (2006.01) |
| *G06T 11/60* | (2006.01) |
| *G06F 3/0488* | (2013.01) |
| *G06F 3/0484* | (2013.01) |
| *B60R 1/07* | (2006.01) |
| *G06F 3/16* | (2006.01) |
| *G06T 11/00* | (2006.01) |

(52) U.S. Cl.
CPC .............. *B60R 1/025* (2013.01); *B60R 1/07* (2013.01); *G06F 3/0488* (2013.01); *G06F 3/04847* (2013.01); *G06F 3/167* (2013.01); *G06T 11/001* (2013.01); *G06T 11/60* (2013.01)

(58) Field of Classification Search
CPC ......... B60R 1/07; B60R 1/025; G06F 3/0488; G06F 3/04847; G06F 3/167; G06T 11/001; G06T 11/60
See application file for complete search history.

(56) References Cited

U.S. PATENT DOCUMENTS

| | | | |
|---|---|---|---|
| 5,745,310 A | 4/1998 | Mathieu | |
| 6,109,755 A | 8/2000 | Duroux et al. | |
| 6,176,587 B1 * | 1/2001 | Fredricks | B60R 1/02 307/10.1 |
| 6,498,620 B2 * | 12/2002 | Schofield | B60N 2/002 348/118 |
| 6,859,148 B2 * | 2/2005 | Miller | B60R 1/00 340/435 |
| 9,586,525 B2 * | 3/2017 | Sejalon | B60R 1/00 |

(Continued)

*Primary Examiner* — Tyler J Lee
(74) *Attorney, Agent, or Firm* — Ralph E Smith

(57) ABSTRACT

A control system and method for controlling side mirrors of a vehicle involve controlling, by a controller, a touch display to display a user interface comprising (i) control elements that enable a driver of the vehicle to control positions of the side mirrors, (ii) a simulated field of view of the driver generated based on current positions of the side mirrors, and (iii) an indication of any portion of the simulated field of view of the driver that corresponds to a blind spot of the driver, receiving, by the controller via the control elements displayed on the touch display, touch input from the driver indicative of desired positions of the side mirrors, and commanding, by the controller, an actuator system to position the side mirrors based on the desired positions indicated by the touch input.

18 Claims, 3 Drawing Sheets

(56) References Cited

U.S. PATENT DOCUMENTS

| | | | |
|---|---|---|---|
| 2005/0111117 A1* | 5/2005 | Qualich | B60R 1/025 359/843 |
| 2008/0169938 A1* | 7/2008 | Madau | B60R 1/00 340/901 |
| 2010/0073480 A1* | 3/2010 | Hoek | G01P 1/08 348/148 |
| 2011/0251768 A1* | 10/2011 | Luo | B60W 30/12 701/70 |
| 2012/0041632 A1* | 2/2012 | Garcia Bordes | B60W 30/0953 701/29.1 |
| 2013/0135089 A1* | 5/2013 | Sejalon | B60R 1/00 340/435 |
| 2014/0147007 A1* | 5/2014 | Hayakawa | G08G 1/167 382/103 |
| 2016/0266778 A1* | 9/2016 | Rawlinson | B60K 35/00 |
| 2016/0364111 A1* | 12/2016 | Piekny | G06F 3/0488 |
| 2017/0297493 A1* | 10/2017 | Gillespey | B60R 1/08 |
| 2019/0143900 A1* | 5/2019 | Van Houten, II | B60R 1/006 |

* cited by examiner

US 10,576,894 B2

SYSTEMS AND METHODS FOR CONTROLLING VEHICLE SIDE MIRRORS AND FOR DISPLAYING SIMULATED DRIVER FIELD OF VIEW

FIELD

The present application generally relates to vehicle side mirror control and, more particularly, to systems and methods for controlling vehicle side mirrors and for displaying a simulated driver field of view.

BACKGROUND

Vehicles typically include electro-mechanical devices (e.g., switches and wiring) that a driver moves to control an actuator system (e.g., an electric stepper motor) to position the vehicle's side mirrors. While the driver may believe that he/she has positioned the vehicle's side mirrors properly, the driver may still experience blind spots while driving (e.g., a portion of a neighboring lane). Accordingly, while such vehicle side mirror control systems work well for their intended purpose, there remains a need for improvement in the relevant art.

SUMMARY

According to one example aspect of the invention, a control system for side mirrors of a vehicle is presented. In one exemplary implementation, the control system comprises a touch display configured to display information and receive touch input and a controller in communication with the touch display and configured to: control the touch display to display a user interface comprising: (i) control elements that enable a driver of the vehicle to control positions of the side mirrors, (ii) a simulated field of view of the driver generated based on current positions of the side mirrors, and (iii) an indication of any portion of the simulated field of view of the driver that corresponds to a blind spot of the driver, receive, via the control elements displayed on the touch display, touch input from the driver indicative of desired positions of the side mirrors, and command an actuator system to position the side mirrors based on the desired positions indicated by the touch input.

In some implementations, the simulated field of view is further based on (i) a position of the driver's seat and (ii) positions of the actuator system. In some implementations, the user interface comprises a simulated overhead view of the vehicle, and wherein the simulated field of view of the driver extends with respect to the simulated overhead view of the vehicle from the side mirrors rearward along sides of the vehicle. In some implementations, portions of the simulated field of view of the driver corresponding to a blind spot of the driver are displayed in a different color than other portions of the simulated field of view of the driver.

In some implementations, the user interface further comprises a user interface element that suggests to the driver that he/she should change the positions of the side mirrors due to the blind spot. In some implementations, a touch input by the driver with respect to the user interface element causes the controller to command the actuator system to position the side mirrors such that there are no blind spots for the driver. In some implementations, the controller is configured to display the user interface only while a transmission of the vehicle is in park.

In some implementations, the controller is further configured to receive, via a driver interface, voice commands from the driver and, based on the voice commands, command the actuator system to change the positions of the side mirrors. In some implementations, a particular voice command causes the controller to control the actuator system to position the side mirrors such that there are no blind spots for the driver.

According to another example aspect of the invention, a method for controlling side mirrors of a vehicle is presented. In one exemplary implementation, the method comprises: controlling, by a controller, a touch display to display a user interface comprising: (i) control elements that enable a driver of the vehicle to control positions of the side mirrors, (ii) a simulated field of view of the driver generated based on current positions of the side mirrors, and (iii) an indication of any portion of the simulated field of view of the driver that corresponds to a blind spot of the driver, receiving, by the controller via the control elements displayed on the touch display, touch input from the driver indicative of desired positions of the side mirrors, and commanding, by the controller, an actuator system to position the side mirrors based on the desired positions indicated by the touch input.

In some implementations, the simulated field of view is further based on (i) a position of the driver's seat and (ii) positions of the actuator system. In some implementations, the user interface comprises a simulated overhead view of the vehicle, and wherein the simulated field of view of the driver extends with respect to the simulated overhead view of the vehicle from the side mirrors rearward along sides of the vehicle. In some implementations, portions of the simulated field of view of the driver corresponding to a blind spot of the driver are displayed in a different color than other portions of the simulated field of view of the driver.

In some implementations, the user interface further comprises a user interface element that suggests to the driver that he/she should change the positions of the side mirrors due to the blind spot. In some implementations, a touch input by the driver with respect to the user interface element causes the controller to command the actuator system to position the side mirrors such that there are no blind spots for the driver. In some implementations, the controller is configured to display the user interface only while a transmission of the vehicle is in park.

In some implementations, the method further comprises receiving, by the controller via a driver interface, voice commands from the driver and, based on the voice commands, commanding the actuator system to change the positions of the side mirrors. In some implementations, a particular voice command causes the controller to control the actuator system to position the side mirrors such that there are no blind spots for the driver.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, conventional vehicle side mirror systems are prone to blind spots. In addition, the electromechanical devices (e.g., switches and wiring) increase vehicle costs. Accordingly, improved systems and methods are presented that utilize a vehicle's touch display (e.g., infotainment system) to receive driver input to control the actuator system to position the vehicle side mirrors. These systems and methods also generate and display a simulated field of view of the driver, which allows the driver to more precisely position the side mirrors. Further, these systems and methods provide indications of blind spots (given known driver's seat and side mirror positions) and allow the driver to manually adjust the side mirror positions via the touch display or to select an automatic adjustment option that automatically positions the side mirrors to eliminate the blind spots (depending also on the current driver seat and side mirror positions).

Figure 1:
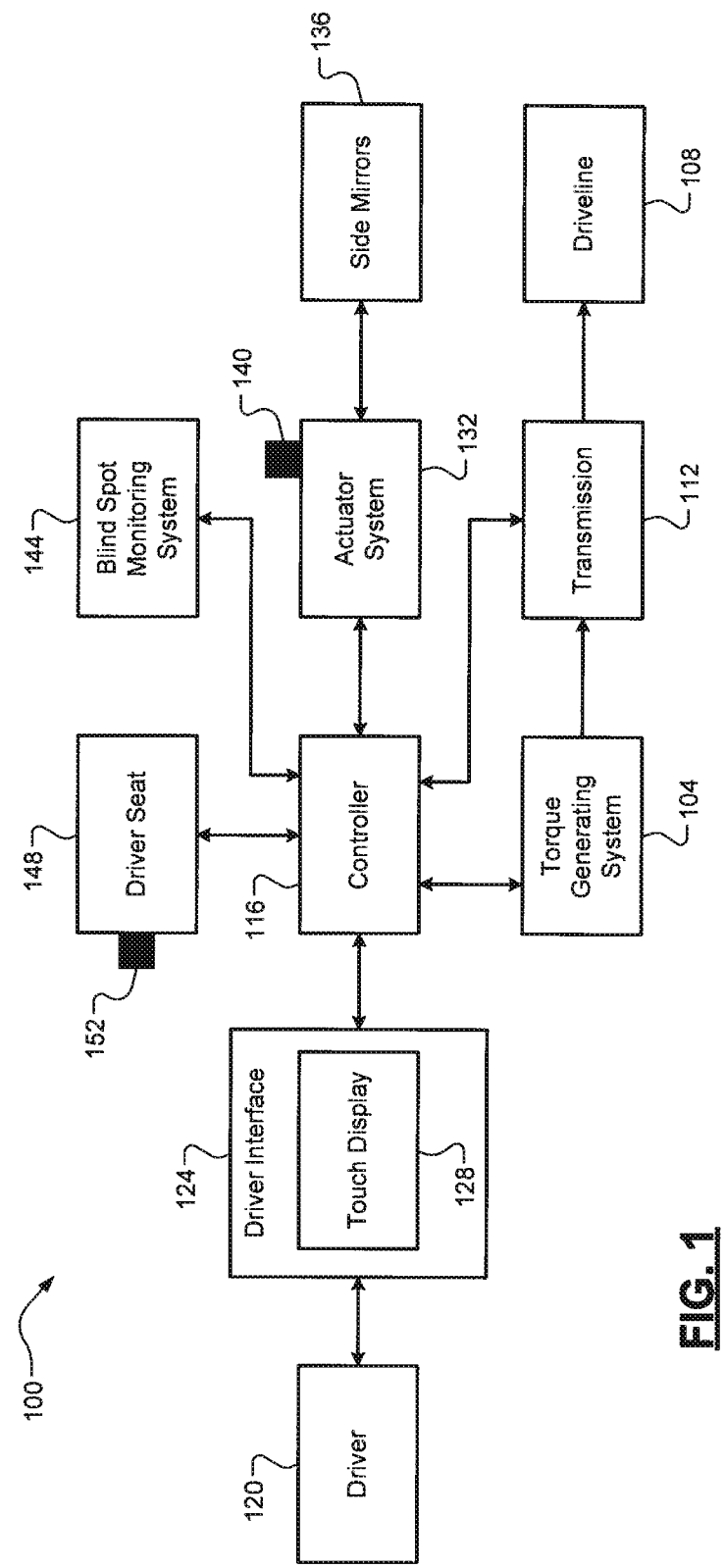
FIG. 1 is a functional block diagram of an example vehicle according to the principles of the present disclosure.

Referring now to FIG. 1, a functional block diagram of an example vehicle 100 is illustrated. The vehicle 100 comprises a torque generating system 104 (an engine, an electric motor, a combination thereof, etc.) that generates drive torque that is transferred to a driveline 108 via a transmission 112. A controller 116 controls operation of the torque generating system 104 and the transmission 112 based on input from a driver 120 of the vehicle 100. The controller 116 receives input from the driver 120 of the vehicle 100 via a driver interface 124. One example component of the driver interface 124 is a touch display 128 (e.g., part of an infotainment system). It will be appreciated that the driver interface 124 could include other components that are not specifically illustrated, such as accelerator and brake pedals and an instrument panel (speedometer, tachometer, etc.).

The controller 116 also controls an actuator system 132 (e.g., two electric stepper motors) to position side mirrors 136 of the vehicle 100. Position sensors 140 measure the position of the side mirrors 136 based on the respective positions of the actuator system 132. The controller 116 also communicates with a blind spot monitoring system 144 that utilizes a system of cameras or sensors (e.g., mounted in a rear bumper of the vehicle 100) to monitor other vehicles or objects proximate to the vehicle 100 (e.g., in neighboring lanes on a road or highway). The controller 116 also monitors a position of the driver's seat 148 using a respective position sensor 152. This is important because the driver's seat position affects the viewing angle of the side mirrors 136 and therefore a projected image on the touch display 128 (see, e.g., FIG. 2 and areas 224a, 224b, 228a, 22bb, and 232, which described in greater detail below).

Figure 2:
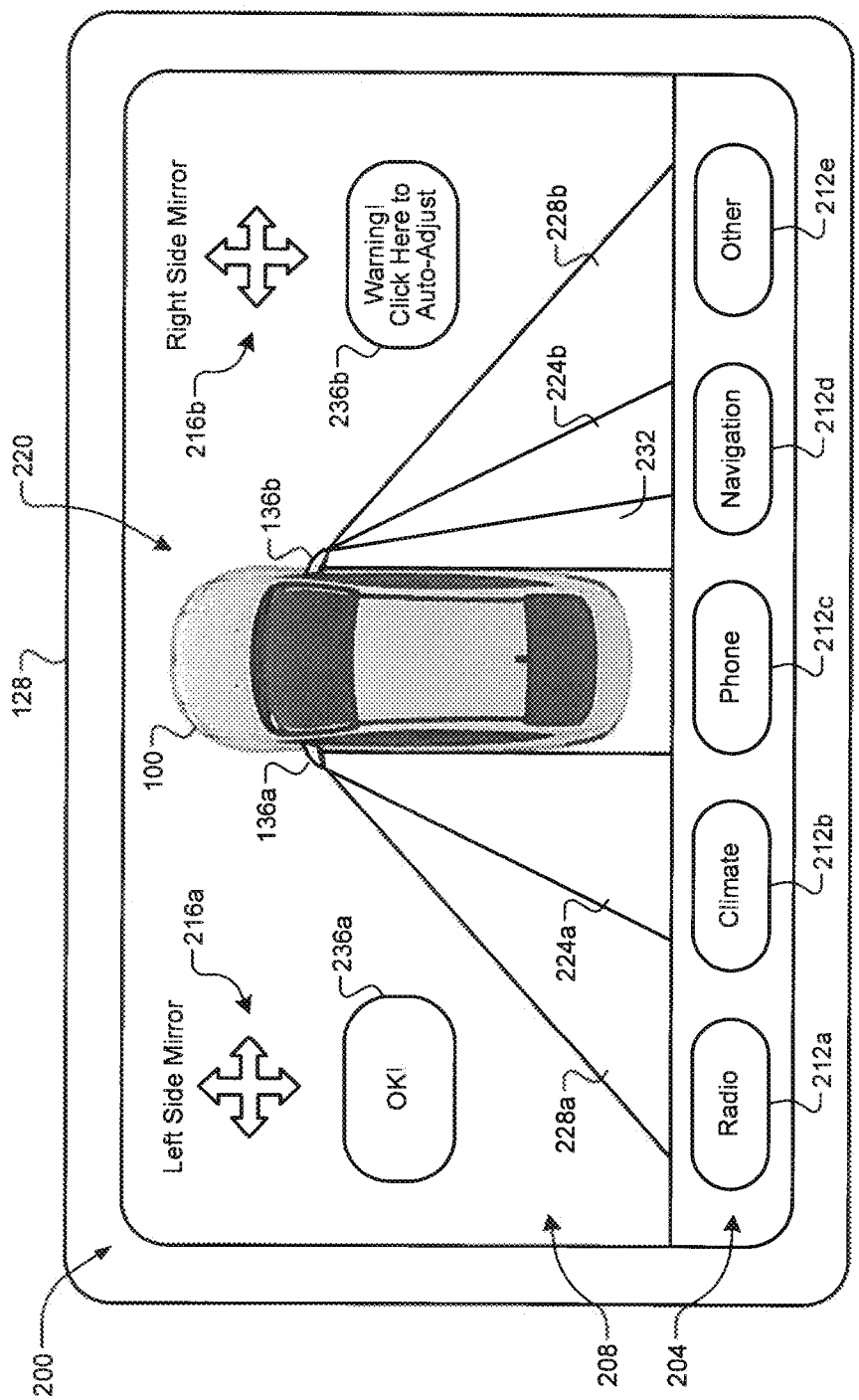
FIG. 2 is a diagram of an example user interface displayed by a touch display of the vehicle according to the principles of the present disclosure.

Referring now to FIG. 2, an example user interface 200 displayable on the touch display 128 is illustrated. The user interface 200 is generally divided into two portions: a lower main control portion 204 and an upper information portion 208. The main control portion 204 includes control elements (e.g., touch-activated or "soft" buttons) such as radio 212a, climate 212b, phone 212c, navigation 212d, and other 212e (collectively elements 212). A touch input selection by the driver 120 of one of these elements 212 will change what is displayed in the information portion 208. For example, selection of radio 212a will cause the information portion 208 to display radio information, such as a current channel being listened to. For purposes of this disclosure, the information portion 208 is utilized to display information to assist the driver 120 in positioning the side mirrors 136. For example, this feature could be accessed via other 212e or another new control element (not shown) specifically for the mirror display features described herein or via a hard button/switch in an instrument panel assembly.

As shown, the information portion 208 of the user interface 200 comprises control elements 216a, 216b (collectively, "control elements 216") and a simulated field of view 220 of the driver 120. The control elements 216a, 216b receive touch input from the driver 120, which causes the controller 116 to command the actuator system 132 accordingly to position the side mirrors 136. Changes to the mirror positions also change the simulated field of view 220 as will now be discussed in greater detail. In one exemplary implementation, the simulated field of view 220 is generally divided into three different types: side mirror coverage portions 224a, 224b, blind spot monitoring system coverage portions 228a, 228b, and blind spot portions 232. Each of these portions could be a different color. For example, the blind spot portions 232 could be red or yellow to convey urgency to the driver 120. These colors and the other colors described herein are merely examples and could vary for different vehicle applications and/or could be selectable by the consumer.

In addition to the blind spot portions 232 of the simulated field of view 220, the user interface 200 could comprise other indications that there is a blind spot. As shown, a left side indicator 236a displays text ("OK!") indicative of there not being a blind spot on the driver's left side. In contrast, the right side indicator 236b displays text ("Warning! Click Here to Auto-Adjust") indicative of there being a blind spot on the driver's right side. These indicators 236 could also be colored to provide further indication, such as indicator 236a being green and indicator 236b being red or yellow to convey urgency to the driver 120. In some implementations, the indicators 236a, 236b are selectable via a touch input from the driver 120. As shown, selection of indicator 236b causes the controller 116 to automatically command the actuator system 132 to adjust side mirror 136b to an optimal position to eliminate the blind spot.

Figure 3:
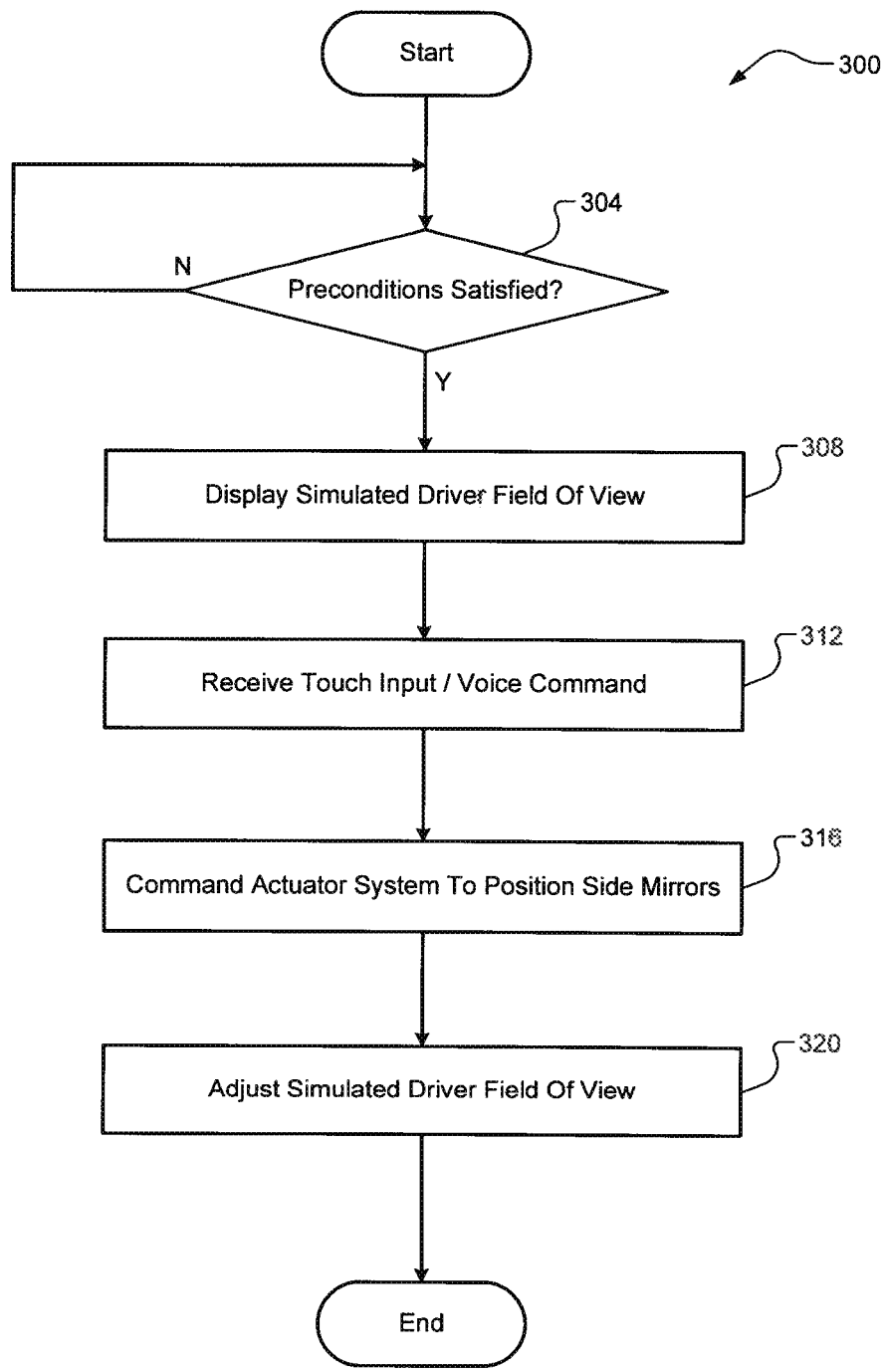
FIG. 3 is a flow diagram of an example method of controlling side mirrors of the vehicle and for displaying a simulated driver field of view according to the principles of the present disclosure.

Referring now to FIG. 3, a flow diagram of an example method 300 for controlling vehicle side mirrors and for displaying a simulated driver field of view is illustrated. At optional 304, the controller 116 determines whether a set of one or more preconditions is satisfied. In one exemplary implementation, the user interface 200 could only be displayed when the transmission 112 of the vehicle 100 is in park. This precondition would allow the driver 120 to focus on and interact with the touch display 128 while not actively driving. The user interface 200 may be displayable and useable during active driving, however, such as after an acknowledgement by the driver 120. The driver 120 could also provide voice commands via the driver interface 124 (e.g., a microphone), which could be interpreted by the controller 116 and could cause the controller 116 to command the actuator system 132 to position the side mirrors 136 accordingly. For example only, the driver 120 could say "auto-adjust my side mirrors" or something similar.

At 308, the controller 116 controls the touch display 128 to display the user interface 200. At 312, the controller 116 receives, via the driver interface 124, input from the driver 120 (touch input, voice input, some combination thereof, etc.) for positioning the side mirrors 136. At 316, the controller 116 commands the actuator system 132 accordingly based on the received input. Lastly, at 320, the controller 116 adjusts the simulated field of view 200 of the user interface 200 displayed on the touch display 128. The controller 116 could also adjust the indicators 236a, 236b to reflect the updated positions of the side mirrors 136. The method 300 then ends or returns to 304. The method 300, for example, may go through multiple loops as the driver 120 repeatedly adjusts the side mirror positions based on the changing simulated field of view, e.g., until all blind spots are eliminated.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be appreciated that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for side mirrors of a vehicle, the control system comprising:
    a touch display configured to display information and receive touch input; and
    a controller in communication with the touch display and configured to:
        control the touch display to display a user interface comprising:
            (i) control elements that enable a driver of the vehicle to control positions of the side mirrors,
            (ii) a simulated field of view of the driver generated based on current positions of the side mirrors, and
            (iii) an indication of any portion of the simulated field of view of the driver that corresponds to a blind spot of the driver;
        receive, via the control elements displayed on the touch display, touch input from the driver indicative of desired positions of the side mirrors; and
        command an actuator system to position the side mirrors based on the desired positions indicated by the touch input.

2. The control system of claim 1, wherein the simulated field of view is further based on (i) a position of the driver's seat and (ii) positions of the actuator system.

3. The control system of claim 1, wherein the user interface comprises a simulated overhead view of the vehicle, and wherein the simulated field of view of the driver extends with respect to the simulated overhead view of the vehicle from the side mirrors rearward along sides of the vehicle.

4. The control system of claim 3, wherein portions of the simulated field of view of the driver corresponding to a blind spot of the driver are displayed in a different color than other portions of the simulated field of view of the driver.

5. The control system of claim 1, wherein the user interface further comprises a user interface element that suggests to the driver that he/she should change the positions of the side mirrors due to the blind spot.

6. The control system of claim 5, wherein a touch input by the driver with respect to the user interface element causes the controller to command the actuator system to position the side mirrors such that there are no blind spots for the driver.

7. The control system of claim 1, wherein the controller is configured to display the user interface only while a transmission of the vehicle is in park.

8. The control system of claim 7, wherein the controller is further configured to receive, via a driver interface, voice commands from the driver and, based on the voice commands, command the actuator system to change the positions of the side mirrors.

9. The control system of claim 8, wherein a particular voice command causes the controller to control the actuator system to position the side mirrors such that there are no blind spots for the driver.

10. A method for controlling side mirrors of a vehicle, the method comprising:
    controlling, by a controller, a touch display to display a user interface comprising:
        (i) control elements that enable a driver of the vehicle to control positions of the side mirrors,
        (ii) a simulated field of view of the driver generated based on current positions of the side mirrors, and
        (iii) an indication of any portion of the simulated field of view of the driver that corresponds to a blind spot of the driver;
    receiving, by the controller via the control elements displayed on the touch display, touch input from the driver indicative of desired positions of the side mirrors; and
    commanding, by the controller, an actuator system to position the side mirrors based on the desired positions indicated by the touch input.

11. The method of claim 10, wherein the simulated field of view is further based on (i) a position of the driver's seat and (ii) positions of the actuator system.

12. The method of claim 10, wherein the user interface comprises a simulated overhead view of the vehicle, and wherein the simulated field of view of the driver extends with respect to the simulated overhead view of the vehicle from the side mirrors rearward along sides of the vehicle.

13. The method of claim 12, wherein portions of the simulated field of view of the driver corresponding to a blind spot of the driver are displayed in a different color than other portions of the simulated field of view of the driver.

14. The method of claim 10, wherein the user interface further comprises a user interface element that suggests to the driver that he/she should change the positions of the side mirrors due to the blind spot.

15. The method of claim 14, wherein a touch input by the driver with respect to the user interface element causes the controller to command the actuator system to position the side mirrors such that there are no blind spots for the driver.

16. The method of claim 10, wherein the controller is configured to display the user interface only while a transmission of the vehicle is in park.

17. The method of claim 16, further comprising receiving, by the controller via a driver interface, voice commands from the driver and, based on the voice commands, commanding the actuator system to change the positions of the side mirrors.

18. The method of claim 17, wherein a particular voice command causes the controller to control the actuator system to position the side mirrors such that there are no blind spots for the driver.

\* \* \* \* \*